US006785044B2

United States Patent
Minami et al.

(10) Patent No.: US 6,785,044 B2
(45) Date of Patent: Aug. 31, 2004

(54) INFRARED TRANSPARENT OPTICAL ELEMENT AND INFRARED IMAGING CAMERA USING THE SAME

(75) Inventors: Shintaro Minami, Tokyo (JP); Osamu Hayashi, Tokyo (JP); Takayuki Nakano, Tokyo (JP); Yasuhisa Tamagawa, Tokyo (JP); Makoto Kamozawa, Tokyo (JP); Tetsuyuki Kurata, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 106 days.

(21) Appl. No.: 10/095,026

(22) Filed: Mar. 12, 2002

(65) Prior Publication Data

US 2002/0176158 A1 Nov. 28, 2002

(30) Foreign Application Priority Data

Apr. 10, 2001 (JP) ..................................... 2001-111263
Sep. 26, 2001 (JP) ..................................... 2001-293785

(51) Int. Cl.$^7$ ............................................. G02B 13/14
(52) U.S. Cl. ..................... 359/356; 359/350; 359/360
(58) Field of Search ................................ 359/356, 350, 359/507, 359, 360

(56) References Cited

U.S. PATENT DOCUMENTS

| 4,907,846 | A |   | 3/1990 | Tustison et al. ............ 359/580 |
| 5,525,802 | A | * | 6/1996 | Hoggins et al. ............ 250/353 |
| 5,667,726 | A | * | 9/1997 | Miyazaki et al. ............ 516/99 |
| 5,753,362 | A | * | 5/1998 | Kawase et al. ............ 428/327 |
| 6,181,468 | B1 | * | 1/2001 | Feng et al. ................. 359/350 |

FOREIGN PATENT DOCUMENTS

| JP | 64-56401 | 3/1989 |
| JP | 1-259301 | 10/1989 |

* cited by examiner

*Primary Examiner*—Drew A. Dunn
*Assistant Examiner*—Joshua L Pritchett
(74) *Attorney, Agent, or Firm*—Leydig, Voit & Mayer, Ltd.

(57) ABSTRACT

An infrared transparent optical element for use as an optical window for an infrared imaging camera includes an infrared transparent substrate, an antireflection film, and a protective film of a polymer material. The infrared transparent substrate has first and second major surfaces opposite each other, and the antireflection film is disposed on each of the first and second major surfaces of the substrate. The protective film is on an outer surface of the antireflection film on the first major surface of the substrate.

14 Claims, 8 Drawing Sheets

INFRARED TRANSPARENT OPTICAL ELEMENT AND INFRARED IMAGING CAMERA USING THE SAME

BACKGROUND OF THE INVENTION

1. Field of the Invention

The present invention generally relates to an infrared transparent optical element, particularly the optical element transparent to infrared rays of light within a wavelength range of about 8 to 12 µm and an infrared imaging camera using such infrared transparent optical element as a window.

2. Description of the Related Art

An infrared imaging camera of a kind generally used in severe environments makes use of an infrared transparent window to isolate the remainder of the imaging system from exposure to humidity, corrosive and abrasive environments. The infrared transparent window has, deposited on a surface thereof, a protective film of an infrared transparent material capable of transmitting therethrough infrared rays of light within the wavelength region of about 8 to 12 µm. The Japanese Laid-open Patent Publications No. 1-259301 (corresponding to U.S. Pat. No. 4,907,846 issued Mar. 13, 1990) and No. 64-56401 published Oct. 17, 1989 and Mar. 3, 1989, respectively, disclose a diamond layer and a carbon layer having a diamond structure (i.e., a diamond-like carbon layer), used for a protective film on the infrared transparent optical element.

Figure 6A:
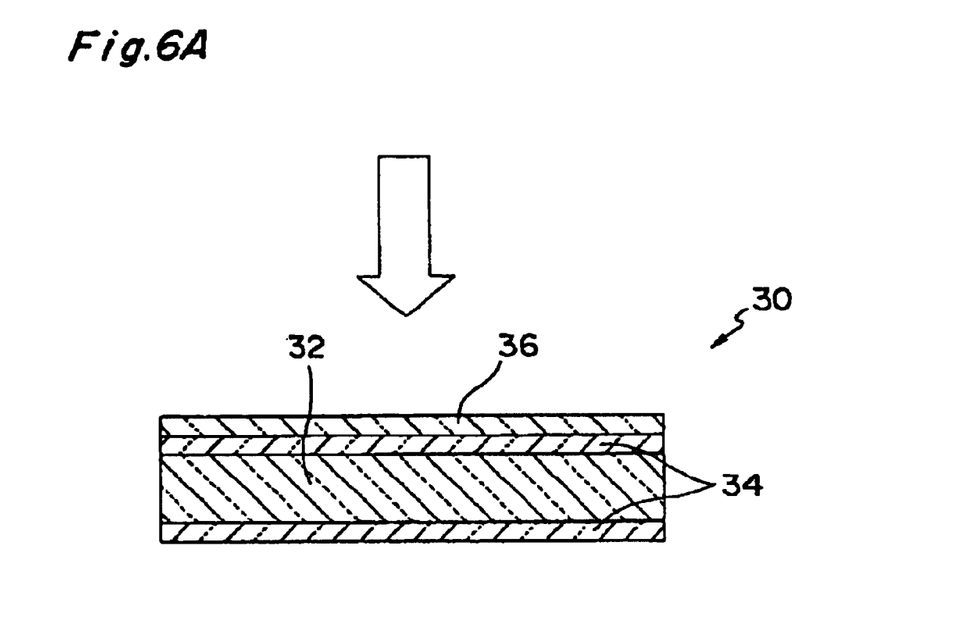
FIG. 6A is a schematic transverse cross sectional view of the conventional optical window used in the infrared imaging camera.
Figure 6B:
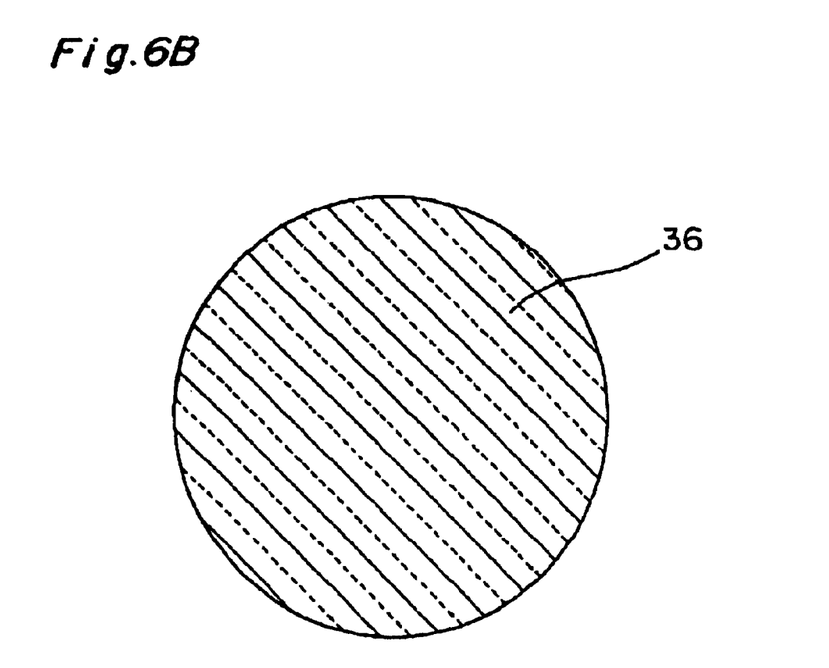
FIG. 6B is a schematic plan view of the optical window shown in FIG. 6A.

FIG. 6A illustrates a transverse sectional representation of the prior art infrared transparent window 30 hitherto used in the conventional infrared imaging camera, and FIG. 6B is a plan view of the infrared transparent window 30 of FIG. 6A as viewed in a direction conforming to the direction of incidence of light indicated by the arrow in FIG. 6A. The illustrated window 30 is made up of an infrared transparent substrate 32 made of, for example, germanium, an antireflection film 34 deposited on each of opposite surfaces of the window 30. The protective film referred to above is indicated by 36 and is formed on one of the antireflection films 34 which faces towards the outside of the infrared imaging camera.

Other than germanium, any of inorganic monocrystalline materials such as silicon, ZnS, ZnSe, KBr, KCI, NaCl, CsI and CsBr can be used as a material for the infrared transparent substrate 32. Where the inorganic monocrystalline material having a high index of refraction such as, for example, germanium, silicon, ZnS or ZnSe is employed as a material for the infrared transparent substrate 32, the antireflection film 34 is formed on each of the opposite surfaces of the substrate 32 as shown in FIG. 6A for the purpose of mitigating a surface reflection loss resulting from the difference in refractive index between the air and the substrate 32. Also, at least one of the antireflection films 34 on the substrate 32, particularly the antireflection film 34 interfacing between the ambient air and the optical system of the infrared imaging camera, is coated with the protective film 36 in the form of a diamond film or a diamond-like carbon film for protecting the anti-reflection film 34.

However, both the diamond film and the diamond-like carbon film that are used as the protective film 36 for the infrared transparent optical element are very expensive and result an in increase of the cost of manufacture of the infrared imaging camera.

Accordingly, the present invention has for its primary object to provide an infrared transparent optical element wherein an inexpensive and highly transmissive protective film is employed in place of the expensive diamond film or diamond-like carbon film.

Another object of the present invention is to provide an infrared imaging camera utilizing the infrared transparent optical element of the kind referred to above.

SUMMARY OF THE INVENTION

In order to accomplish these and other objects and features of the present invention, there is provided an infrared transparent optical element for use as an optical window for an infrared imaging camera. This infrared transparent substrate having first and second major surfaces opposite to each other, and an antireflection film formed on each of the first and second major surfaces of the substrate. A protective film made of a polymer material is formed on an outer surface of the antireflection film on the first major surface of the substrate.

If the polymer material is employed in the form of an ultrahigh molecular weight, high density polyethylene having a weight-average molecular weight not smaller than 1,600,000, the optical element can be obtained which has an excellent impact strength, an excellent abrasion resistance and an excellent weatherability while exhibiting a satisfactory transmission of infrared rays of light. If this protective film made of the ultrahigh molecular weight, high density polyethylene has a thickness not greater than 0.1 mm, not only can reduction in transmissivity be minimized, but also the protective film, if fusion bonded, can be firmly interlocked with the antireflection film on the first major surface of the substrate.

The use of a metal mount is preferred to enclose the substrate in contact with a peripheral side face thereof.

Preferably, the metal mount has annular end faces opposite to each other, at least one of the annular end faces is surface roughened, and the protective film covering the first major surface of the substrate extends to cover the surface roughened annular end face of the metal mount. In this way, the protective film can be physically interlocked with the annular face of the metal mount while a major portion thereof is fusion bonded to the substrate.

If the metal mount has a coefficient of linear thermal expansion that is greater than that of the substrate, an annular gap can be formed between the substrate and the metal mount when during the manufacture of the optical element the both are heated. This annular gap may be utilized to firmly clamp a portion of the protective film between the substrate and the metal mount upon cooling of the metal mount. To ensure the clamp to be achieved, the difference between the coefficient of linear thermal expansion of the metal mount and that of the substrate is preferably equal to or greater than $2 \times 10^{-6}$.

Preferably, the infrared transparent substrate is made of silicon and has a thickness in the range of 1 to 3 mm.

Furthermore, an adhesive layer may be formed between the antireflection film formed on the first major surface of the substrate and the protective film. The adhesive layer is preferably made of polyethylene having a weight-average molecular weight of 10,000 to 500,000. The protective film may include a high-density layer formed on the antireflection film, and a low-density layer formed on the high-density layer. Also, the low density layer may have such a refractive index gradient that the reflection index of the high density layer side is greater than that of the low density layer side.

The infrared transparent substrate is preferred to have a curved surface capable of working as a lens.

According to another aspect of the invention there is provided an infrared imaging camera. This infrared imaging camera includes an infrared transparent optical element according to any one of claims 1 to 13, and an optical system capable of imaging an infrared rays of light which passes through the an infrared transparent optical element.

According to further aspect of the invention there is provided a method of producing an infrared transparent optical element for use as an optical window for an infrared imaging camera including an infrared transparent substrate having first and second major surfaces opposite to each other, wherein infrared rays of light emanating from an object enter the infrared transparent substrate through the first major surface and emerge outwardly from the infrared transparent substrate through the second major surface, an antireflection film formed on each of the first and second major surfaces of the substrate, and a protective film made of a polymer material and formed on an outer surface of the antireflection film on the first major surface of the substrate. This method includes the steps of placing a ultrahigh molecular weight, high density polyethylene film, which is used for the protective film, on the antireflection film of the first major surface so as to form a multi-layer body, and sandwiching the multi-layer body between a pair of heated molds by pressing, and thereby laminating the polyethylene film on the antireflection film of the first major surface side.

Preferably, one of the pair of molds, which is disposed at the polyethylene film side, have a mold surface with a fine roughness, and the low density layer is formed on the protective film by transferring the fine roughness of the mold surface onto the surface of the protective film. The low density layer may be formed on the surface of the protective film by laminating a polyethylene film having a weight-average molecular weight of 10,000 to 500,000 on the protective film and etching the laminated polyethylene film using an acid solution.

It is preferable that at least one of the first and second major surfaces of the infrared transparent substrate has a curved shape, and an elastic member having a mating surface capable of matching with the curved shape is disposed between the mold disposed at the first major surface of the infrared transparent substrate and the multi-layer body. The multi-layer body is sandwiched between the pair of molds through the elastic member and laminated by hot pressing, and thereby fusion bonding the ultrahigh molecular weight, high density polyethylene film to the antireflection film of the first major surface side.

If the curved shape of the infrared transparent substrate is expressed in accordance with a formula by employing the three dimensional xyz co-ordinates $Z=f(x, y)$, the mating surface of the elastic member which is capable of matching with the curved shape may be expressed in accordance with a formula $Z=f(ax, ay)/a$, where $0<a\leq 1$.

BRIEF DESCRIPTION OF THE DRAWINGS

The present invention will become readily understood from the following description of a preferred embodiment thereof made with reference to the accompanying drawings, in which like parts are designated by like reference numeral and in which.

DETAILED DESCRIPTION OF THE PREFERRED EMBODIMENTS

This application is based on patent applications No. 2001-111263 and No. 2001-293785 filed in Japan, the disclosure of which are herein incorporated by reference.

Embodiment 1

Figure 1A:
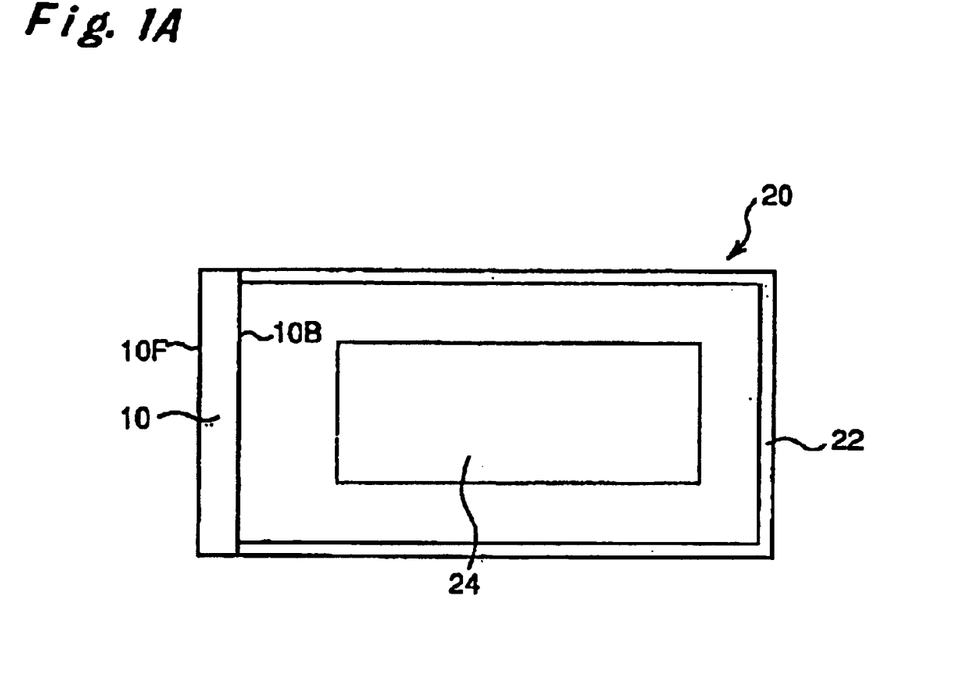
FIG. 1A is a schematic diagram showing an infrared capturing unit of an infrared imaging camera according to the first embodiment of the present invention.

An infrared capturing unit generally identified by 20 in FIG. 1A is a component part of the infrared imaging camera (not shown) and makes use of an infrared transparent optical window 10. So far shown in FIG. 1A, the infrared capturing unit 20 includes a water-proof casing 22 and an optical system 24 disposed within the water-proof casing 22 and comprised of one or more lens elements and an imaging element. The water-proof casing 22 has an opening defined therein in alignment with an optical axis of the optical system 24, which opening is closed by the optical window 10 that is mounted on the casing 22 in a manner sufficient to shield the optical system 24 from an external environment.

As shown therein, the optical window 10 has front and rear surfaces 10F and 10B opposite to each other and is mounted on the casing 22 with the front surface 10F thereof oriented outwardly of the capturing unit 20 whereas the rear surface 10B faces the optical system 24. As such, infrared rays of light emanating from an object to be imaged are captured by the optical system 24, having crossed the optical window 10 from the front surface 10F to the second surface 10B.

Although not show, the infrared imaging camera includes, in addition to the infrared capturing unit 20 of the structure discussed above, a data processing circuit.

Figure 1B:
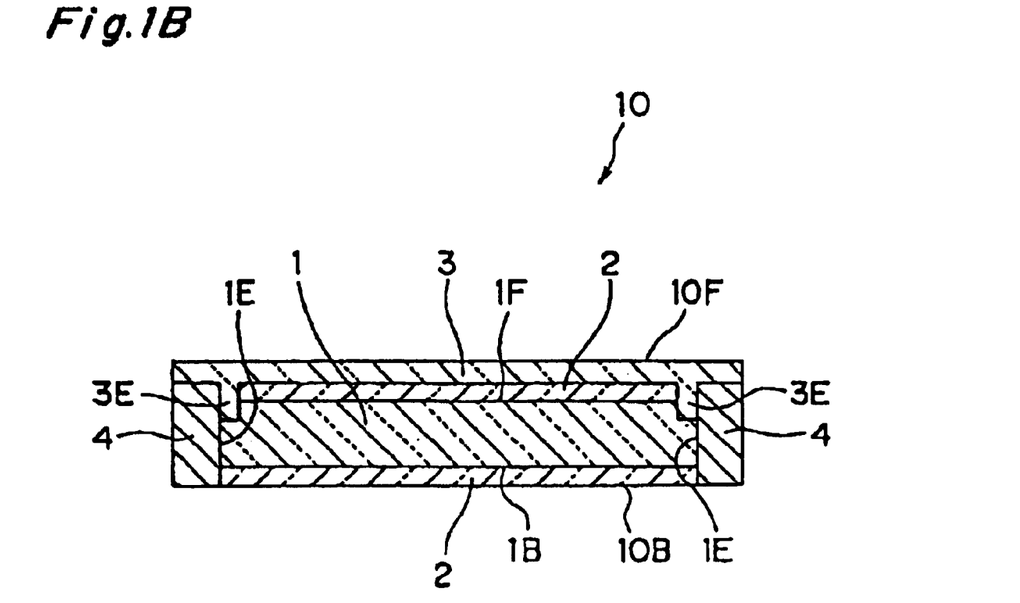
FIG. 1B is a schematic transverse cross sectional view of an infrared transparent optical element, used as an optical window of the capturing unit shown in FIG. 1A.
Figure 2A:
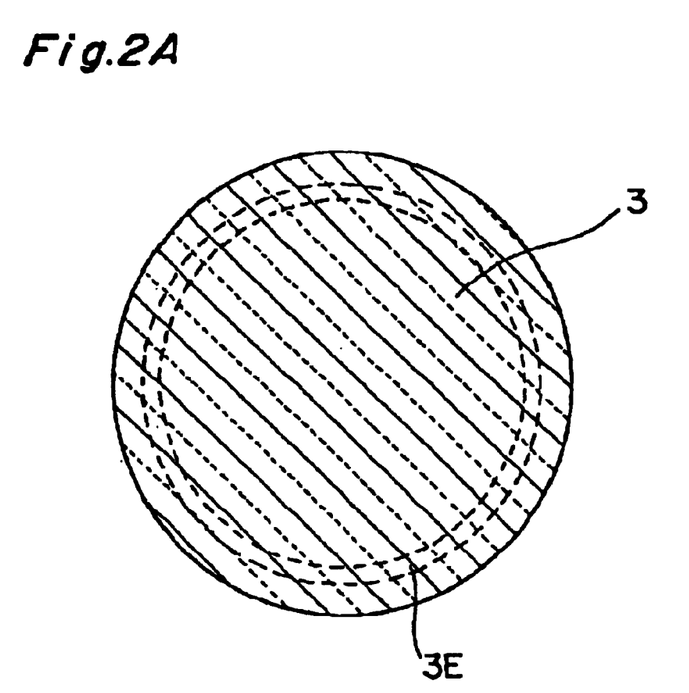
FIG. 2A is a schematic plan view of the infrared transparent optical element as viewed from a first major surface thereof.
Figure 2B:
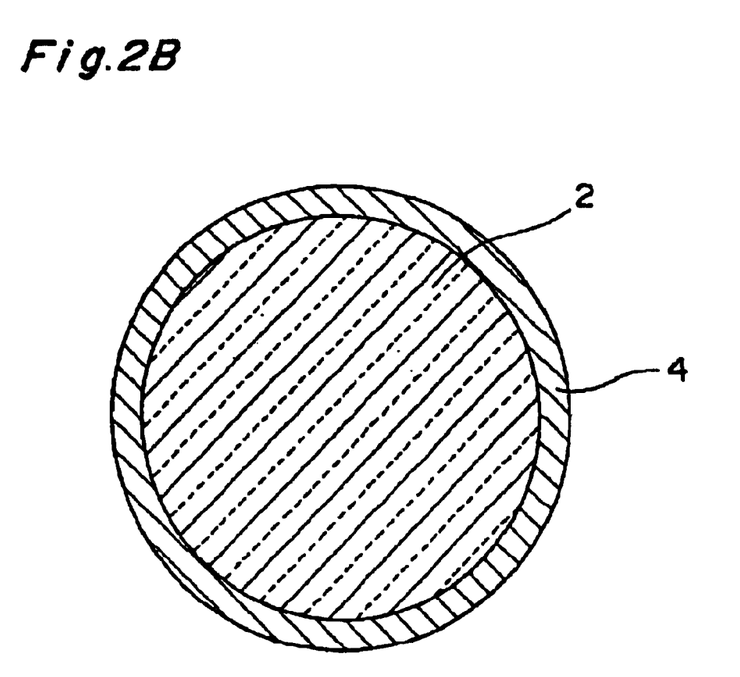
FIG. 2B is a view similar to FIG. 2A, showing the optical element as viewed from a second major surface thereof.

Referring now to FIG. 1B and FIGS. 2A and 2B, the optical window 10 includes an infrared transparent substrate 1 that is round in shape and has first and second major surfaces 1F and 1B opposite to each other and a peripheral side face 1E which may be right-angled to any one of the first and second major surfaces 1F and 1B. The first and second major surfaces 1F and 1B of the substrate 1 define the front and rear surfaces 10F and 10B of the optical window 10, respectively, and have a respective antireflection film 2 formed thereon. A protective film 3, the details of which will be described later, is formed on the antireflection film 2 that lies on the first major surface 1F of the substrate 1. The peripheral side face 2E of the substrate 1 is enclosed by a metal mount or frame 4.

The protective film 3 is preferably made of an ultrahigh molecular weight, high density polyethylene having a weight-average molecular weight within the range of 1,600,000 to 6,000,000 and preferably within the range of 2,000,000 to 3,600,000. Since the ultrahigh molecular weight, high density polyethylene is inexpensive as compared with the diamond film or the diamond-like carbon film, the use of such specific material for the protective film 3 does indeed contribute to reduction in cost of manufacture of the optical window.

The ultrahigh molecular weight, high density polyethylene referred to above exhibits an extremely low absorption of infrared rays within the wavelength region of about 8 to 12 $\mu$m and, therefore, reduction in transmissivity can be suppressed. It is, however, to be noted that considering the reduction in transmissivity brought about by the thickness of the protective film 3 made of the ultrahigh molecular weight, high density polyethylene, the protective film 3 preferably has a thickness not greater than 0.1 mm, preferably not greater than 0.05 mm. Also, considering that the ultrahigh molecular weight, high density polyethylene has a high impact strength, a high resistance to frictional wear, a high water proof and a high self-lubricating property, it is suited as a material for the protective film 3 for protecting the infrared transparent substrate 1.

The infrared transparent substrate 1 is made of a material transparent to infrared rays of light of a wavelength within the range of about 8 to 12 $\mu$m. Examples of this material may include silicon, germanium, ZnS and ZnSe. On the other hand, the metal mount 4 encircling the peripheral side face 1E of the substrate 1 is preferably made of steel (iron), stainless steel, brass, phosphor bronze, titanium, or a magnesium alloy. While the manner in which the optical window 10 is manufactured will be described later, respective materials for the substrate 1 and the metal mount 4 should be so selected that the metal mount 4 can have a coefficient of linear thermal expansion that is greater than that of the substrate 1.

The infrared transparent substrate made of silicon may provide a more inexpensive optical element than the substrates made of expensive materials such as Ge. However, it is to be noted that silicon exhibits an absorption of infrared rays and brings about 10% loss of light volume per 1 mm thickness within the wavelength region of about 8 to 12 $\mu$m. Therefore, the infrared transparent substrate made of silicon having a thickness less than 3 mm can suppress the reduction in transmissivity to be not greater than 30%. Also, the substrate having a thickness more than 1 mm has a high impact strength and high durability for outdoor use.

The antireflection film 2 on each of the first and second major surfaces 1F and 1B of the substrate 1 serves to minimize an unwanted reflection of light. Specifically, the antireflection film 2 on the first major surface 1F of the substrate 1 serves to minimize the reflection at the interface between the protective film 3 and the first major surface 1F, whereas the antireflection film 2 on the second major surface 1B of the substrate 1 serves to minimize the reflection at the interface between the second major surface 1B and the air. Any suitable material such as, for example, Ge, ZnSe or ZnS may be used for the antireflection films 2, provided that it serves the purpose.

Figure 3A:
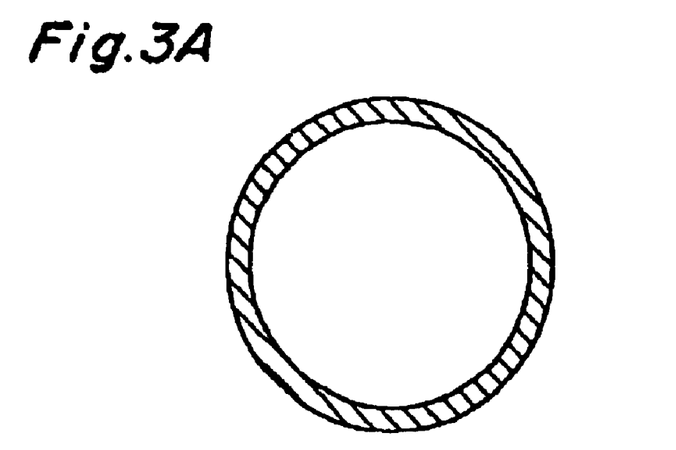
FIGS. 3A to 3C are schematic plan views, showing various mounts that can be used in association with the optical window according to the first embodiment of the present invention.
Figure 4A:
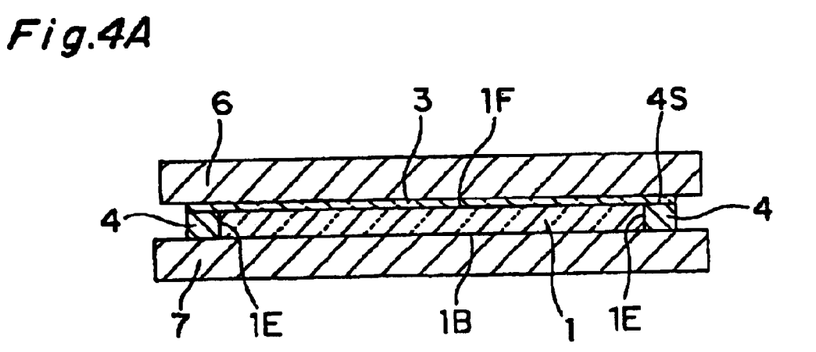
FIGS. 4A to 4D are schematic side cross sectional views of a press machine, showing the sequence of manufacture of the optical window according to the first embodiment of the present invention.

Referring now to FIGS. 4A to 4D, the optical window 10 of the present invention is preferably manufactured in the manner, which will now be described. Prior to formation of the protective film 3, the substrate 1, made of, for example, silicon must have the antireflection films 2 formed respectively on the first and second major surfaces 1F and 1B thereof. Formation of the antireflection films 2 on the substrate 1 may be done in any known manner. While the metal mount 4 made of, for example, brass is placed on a hot plate 7 and representing a ring shape as shown in FIG. 3A, this substrate 1 is then placed inside the metal mount 4 with its peripheral side face 1E held in contact therewith substantially as shown in FIG. 4A.

A sheet of ultrahigh molecular weight, high density polyethylene having a molecular weight of 3,400,000 and a thickness of 0.05 mm, which eventually forms the protective film 3 as will be described later, is placed over the substrate 1 so as to encompass an entire area delimited by an outer perimeter of the metal mount 4, and the assembly is then set in position between the hot plate 7 and a press 6 as shown in FIG. 4A. Prior to the placement of the polyethylene sheet, an annular end face 4s of the metal mount 4, which is flush with the first major surface 1F of the substrate 1, is preferably surface roughened to form surface indentations thereon, so that the eventually formed protective film 3 can be firmly interlocked with the metal mount 4.

Figure 4B:
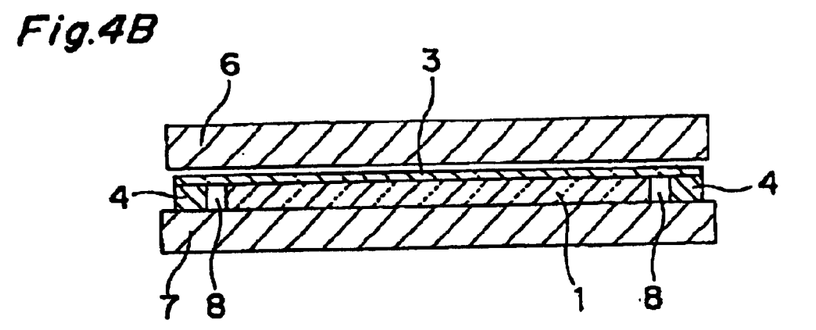
Figure 4C:
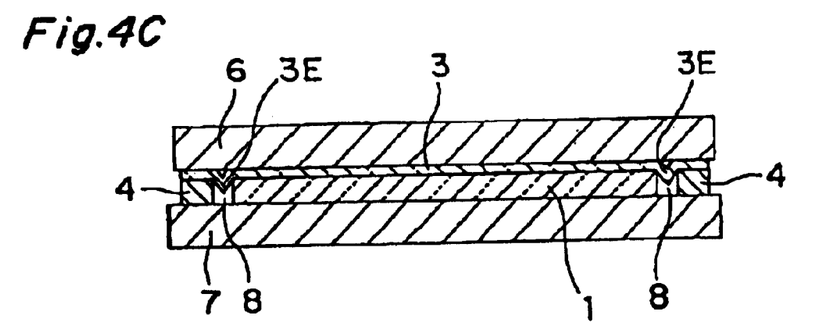

Thereafter, as shown in FIG. 4B, the hot plate 7 is heated to a temperature not lower than 150° C. and preferably within the range of 170 to 220° C. Specifically, where the metal forming the metal mount 4 has a coefficient of linear thermal expansion greater than that of the material for the substrate 1 such as in the illustrated embodiment wherein brass for the metal mount 4 and silicon for the substrate 1 have a coefficient of linear thermal expansion of $18.4 \times 10^{-6}$ and $4.2 \times 10^{-6}$, respectively, the metal mount 4 expands a greater quantity than the substrate 1 does during increase of the temperature, leaving an annular gap 8 between the peripheral side face 1E of the substrate 1 and the metal mount 4.

With respect to the other materials that can be employed for the substrate 1 and the metal mount 4 in the practice of the present invention, they have such a coefficient of linear thermal expansion as tabulated in Table 1 below.

TABLE 1

|  | Material | Coefficient of Linear Thermal Expansion |
|---|---|---|
| Substrate | Silicon | $4.2 \times 10^{-6}$ |
|  | Germanium | $6.1 \times 10^{-6}$ |
|  | ZnS | $6.9 \times 10^{-6}$ |
|  | ZnSe | $8.5 \times 10^{-6}$ |

TABLE 1-continued

| | Material | Coefficient of Linear Thermal Expansion |
|---|---|---|
| Mount | Steel | $11.7 \times 10^{-6}$ |
| | Stainless Steel | $17.3 \times 10^{-6}$ |
| | Brass | $18.4 \times 10^{-6}$ |
| | Phosphor Bronze | $18.4 \times 10^{-6}$ |
| | Titanium | $8.4 \times 10^{-6}$ |
| | Magnesium Alloy | $25.9 \times 10^{-6}$ |

In the practice of the present invention, a combination of the respective materials for the substrate 1 and the metal mount 4 is preferably so chosen as to result in a difference in coefficient of linear thermal expansion which is equal to or greater than about $2 \times 10^{-6}$. As shown in Table 2, silicon or germanium when used for the substrate 1 may be used in combination with the metal mount 4 made of any one of steel, stainless steel, brass, phosphor bronze, titanium and the magnesium alloy; and ZnS or ZnSe when used for the substrate 1 may be used in combination with the metal mount 4 made of any one of steel, stainless steel, brass, phosphor bronze, and the magnesium alloy.

TABLE 2

| Number | Material for Substrate | Material for Mount |
|---|---|---|
| 1 | Silicon | Steel |
| 2 | | Stainless steel |
| 3 | | Brass |
| 4 | | Phosphor bronze |
| 5 | | Titanium |
| 6 | | Magnesium alloy |
| 7 | Germanium | Steel |
| 8 | | Stainless steel |
| 9 | | Brass |
| 10 | | Phosphor bronze |
| 11 | | Titanium |
| 12 | | Magnesium alloy |
| 13 | ZnS | Steel |
| 14 | | Stainless steel |
| 15 | | Brass |
| 16 | | Phosphor bronze |
| 17 | | Magnesium alloy |
| 18 | ZnSe | Steel |
| 19 | | Stainless steel |
| 20 | | Brass |
| 21 | | Phosphor bronze |
| 22 | | Magnesium alloy |

Figure 3B:
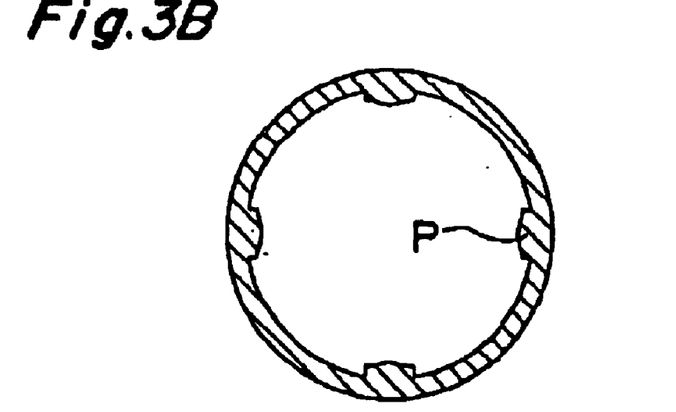
Figure 3C:
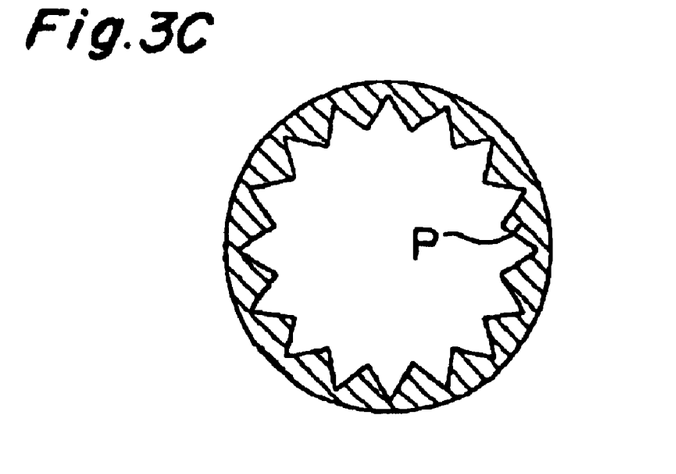

The presence of the difference in coefficient of linear thermal expansion between the substrate 1 and the metal mount 4 is effective to define the annular gap 8 therebetween when the both are heated as shown in FIG. 4B.

Where no difference in coefficient of linear thermal expansion is taken into consideration and the substrate 1 and the metal mount 4 are made of respective materials of equal or about equal coefficients of linear thermal expansion, the use is preferred of the metal mount 4 of a structure wherein as shown in FIG. 3B or 3C a plurality of radially inwardly extending projections P are formed on an inner surface of the metal mount 4. The presence of the projections P in the metal mount is effective not only to define the annular gap 8 between the substrate 1 and the metal mount 4, but also to allow portions of the polyethylene sheet that flow in between the substrate 1 and the metal mount 4 during the heating thereof, to be hitched by the projections P.

Accordingly, as is the case with the optical window 10 shown in FIG. 1B, the protective film 3 can be clamped in between the peripheral side face it of the substrate 1 and the metal mount 4, the protective film 3 can be fusion bonded to the first major surface 1F of the substrate 1 and the annular end face 4S of the metal mount 4 so firmly that separation therebetween would hardly occur.

It is, however, to be noted that the metal mount 4 having the projections as shown in FIG. 3B or 3C can be equally employed even where the metal mount 4 having a coefficient of linear thermal expansion greater than that of the substrate 1 is employed. Even in this case, the protective film 3 can be clamped in between the peripheral side face 1E of the substrate 1 and the metal mount 4, the protective film 3 can be fusion bonded to the first major surface 1F of the substrate 1 and the annular end face 4s of the metal mount 4 so firmly that separation therebetween would hardly occur.

Subsequent to the condition shown in FIG, 4B, while the hot plate 7 is heated, the press 6 is lowered to apply a pressure to the assembly to cause the polyethylene sheet to be fusion bonded to the first major surface 1F of the substrate and the annular end face 4s of the metal polyethylene sheet as it is substantially melted flows into the annular gap 8 between the substrate 1 and the metal mount 4 as indicated by 3E.

Thereafter, the hot plate 7 and, hence, the assembly sandwiched between the plates 6 and 7 is allowed to cool down to room temperatures. As the temperature decreases, the metal mount 4 shrinks with the gap 8 consequently narrowed radially inwardly until the inner peripheral surface of the metal mount is bonded to the peripheral side face 1F of the substrate with the sags 3E of the polyethylene sheet and, hence, the protective film 3 intervening therebetween. In this way, since the protective film 3 is fusion bonded to the first major surface 1F of the substrate 1 and the annular end face 4S of the metal mount while the sags 3E thereof are firmly clamped in between the substrate 1 and the metal mount 4, the protective film 3 will hardly separate from any one of the substrate and the metal mount 4.

Figure 4D:
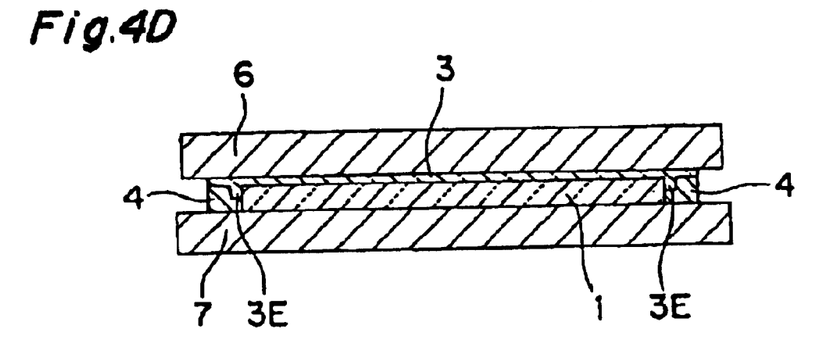

It is to be noted that the assembly is preferably held in position between the plates 6 and 7 until the temperature of the substrate 1 decreased down to a value lower than 100° C. and preferably lower than 50° C., so that during the cooling process as shown in FIG. 4D, the polyethylene sheet and, hence, the protective film 3 can be assuredly clamped in between the side face 1E of the substrate 1 and the metal mount 4.

Figure 5A:
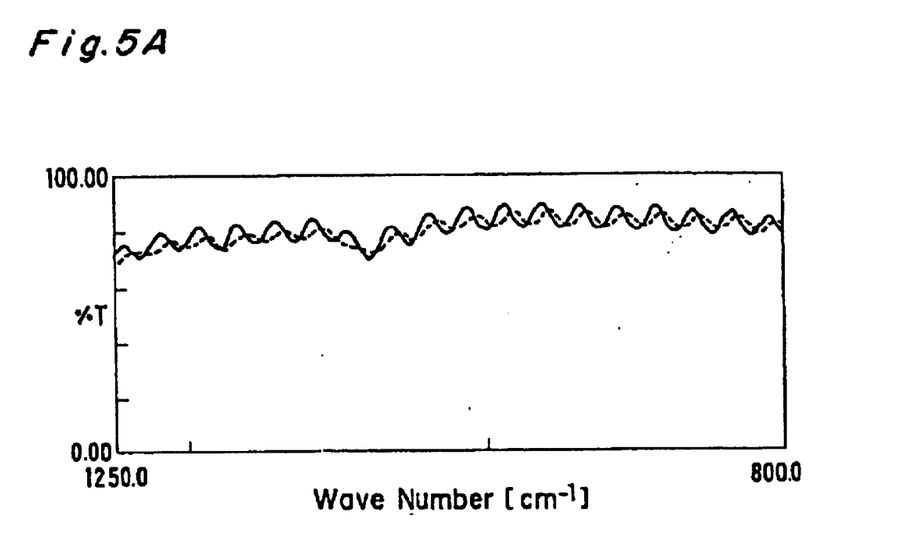
FIG. 5A is a graph showing results of abrasive tests conducted on the optical window according to the first embodiment of the present invention.

The optical window 10 manufactured in the manner hereinabove described was subjected to an abrasive test using a steel wool, to determine the abrasion resistance of the protective film 3. The optical window 10 so tested was of the structure in which the substrate 1 was made of a single crystalline silicon having a crystalline orientation of (111), the metal mount 4 was made of brass and the protective film was made of an ultrahigh molecular weight, high density polyethylene film having a molecular weight of 3,400,000 and a thickness of 0.05 mm. Results of the abrasive tests are shown in FIG. 5A, wherein the solid line and the broken line represent spectra of absorption of infrared rays of a wavelength within the range of 8 to 12 $\mu$m exhibited before and after the protective film 3 of the optical window 10 having been rubbed with the steel wool, respectively. As shown in FIG. 5A, it is dear that in the optical widow 10 manufactured by the present invention, the transmissivity of the optical window 10 was, after the protective film 3 has been rubbed with the steel wool, reduced only 1% or less on an average from that before the abrasive test.

For comparison purpose, a comparative optical window similar to the optical window 10 except that a high density polyethylene film having a molecular weight of 300,000 and a thickness of 0.05 mm was used for the protective film 3 was manufactured in a manner similar to that described hereinbefore was subjected to a similar abrasive test. Results of the abrasive tests are shown in FIG. 5B, and it is clear that the transmissivity of the comparative optical window was, after the protective film has been rubbed with the steel wool, reduced 5% on an average from that before the abrasive test.

Figure 5B:
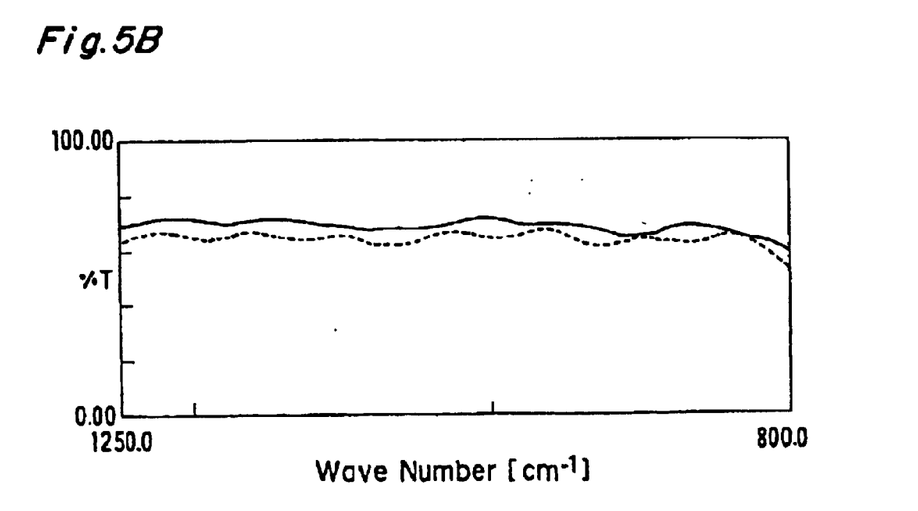
FIG. 5B is a graph showing results of similar abrasive tests conducted on an optical window used for comparison purpose.

Comparison between FIGS. 5A and 5B makes it clear that reduction of the infrared transmissivity exhibited by the optical window 10 of the present invention after the abrasive test has been rubbed is much smaller than that exhibited by the comparative optical window and, thus, the protective film 3 made of the ultrahigh molecular weight, high density polyethylene such as used in the optical window 10 of the present invention is excellent in abrasion utilizing the optical window 10 of the present invention is used for outdoors imaging, reduction in transmissivity will hardly occur even when abrasive media such as sand particles impinge upon the protective film 3.

(Comparison)

Hereinafter, the optical window for comparison will be described.

Using ZnSe as material for the substrate 1, the metal mount 4 made of titanium and of the structure shown in FIG. 3A, and an ultrahigh molecular weight, high density polyethylene film of 0.05 mm in thickness for the protective film, the optical window for Comparison 1 was prepared. At this time, the hot plate was heated to 150° C.

The resultant optical window for comparison was thereafter subjected to a heat cycle test. During the heat cycle test, the polyethylene film separated from the substrate 1, and thus, it has been found that the polyethylene film was not sufficiently fusion bonded to the substrate possibly by the following reason.

As shown in Table 1, ZnSe used for the substrate in the optical window for comparison has a coefficient of linear thermal expansion of $8.5 \times 10^{-6}$ and titanium for the metal mount 4 has a coefficient of linear thermal expansion of $8.4 \times 10^{-6}$. The difference between these coefficients of linear thermal expansion is very small and, therefore, when the hot plate was heated during the manufacture, no sufficient gap such as indicated by 8 was formed between the side face 1E of the substrate 1 and the metal mount 4 and, consequently, the polyethylene film 3 could not be sufficiently clamped in between the side face 1E of the substrate 1 and the metal mount 4. Accordingly, it was not possible for the polyethylene film 3 to be firmly fusion bonded to the surface 1F of the substrate and the annular face 4s of the metal mount.

Embodiment 2

Figure 7:
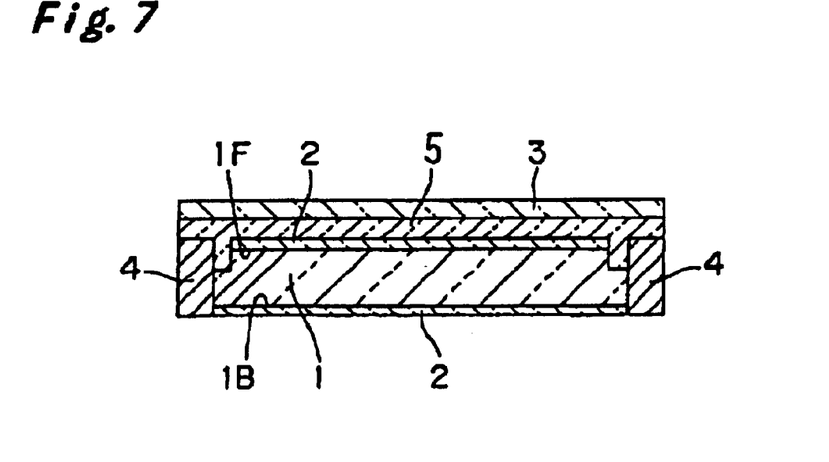
FIG. 7 is a schematic transverse cross sectional view of an optical window according to the second embodiment of the present invention.

FIG. 7 is a schematic cross sectional view showing the structure of the infrared transparent optical element of this embodiment. In the second embodiment, the optical element is similar in construction to that according to the first embodiment, except for an adhesive layer provided between the antireflection film 2 formed on the first major surface 1F of the infrared transparent substrate 1 and the protective film 3. The protective film 3 and the antireflection film 2 can be firmly interlocked through the adhesive layer 5. The adhesive layer 5 may be formed of a polyethylene having a weight-average molecular weight smaller than 500,000 by the following manner.

A polyethylene film having a weight-average molecular weight smaller than 500,000 and a polyethylene film having a weight-average molecular weight within the range of 1,600,000 to 6,000,000 are placed on the antireflection film 2 formed on the first major surface 1F of the infrared transparent substrate 1 in this order, thereby to complete a multi-layer body for forming. Then this multi-layer body is sandwiched between a pair of molds including a press 6 and a hot plate 7 by pressing, and the molds are subsequently heated. The polyethylene film having a weight-average molecular weight smaller than 500,000 is fusion bonded to the antireflection film 2 thereby to form the adhesive layer 5. Also the polyethylene film having a weight-average molecular weight smaller than 500,000 is fusion bonded to the polyethylene film having a weight-average molecular weight within the range of 1,600,000 to 6,000,000 and forms a mixed phase at their interface, and thereby laminating the multi-layer body.

The polyethylene film having a weight-average molecular weight smaller than 500,000 has a greater fluidity than that of the polyethylene film having a weight-average molecular weight within the range of 1,600,000 to 6,000,000 when fusing, therefore, it is to be noted that the polyethylene film having a weight-average molecular weight smaller than 500,000 can diffuse easily into the surface roughness of the antireflection film 2 and also the gap between the infrared transparent substrate 1 and metal mount 4 and thereby firmly interlocking the protective film 3 and the antireflection film 2. Also, the protective film including the ultrahigh molecular, high density polyethylene can provide the protective film that has excellent impact strength, an excellent abrasion resistance and an excellent weatherability.

Embodiment 3

Figure 8:
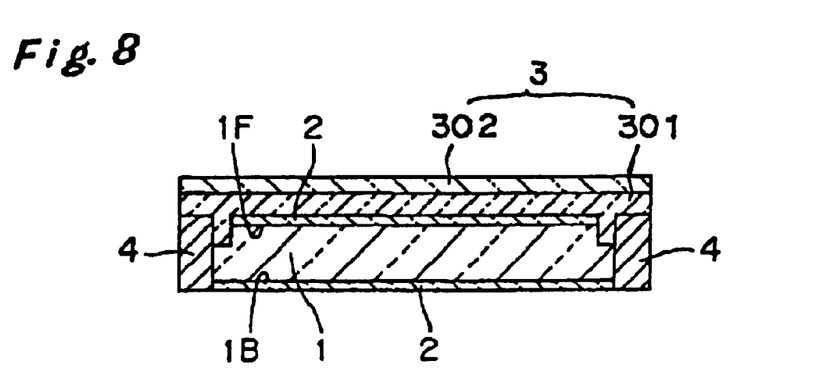
FIG. 8 is a schematic transverse cross sectional view of an optical window according to the third embodiment of the present invention.

FIG. 8 is a schematic cross sectional view showing the structure of the infrared transparent optical element of this embodiment. In the third embodiment, the optical element is similar in construction to that according to the first embodiment, except for providing a protective film 3 including a high density layer 301 formed on the antireflection film and a low density layer 302 formed on the high density layer 301, and imparting to the protective film such a gradient of refractive index that in the protective film a refractive index of the high density layer side is greater than that of the surface side that the infrared rays enters.

Since the protective film 3, which includes the ultrahigh molecular, high density polyethylene, is composed of the high density layer 301 and the low density layer 302 which has a porous structure and a low density than that of the high density layer, the low density layer can work as an antireflection layer against the incident light. That is, the low density layer has a refractive index of 1 at the surface of incidence of the infrared rays, and also has a gradient of the refractive index so that the refractive index increases with accessing to the high density layer 301 and becomes equal to the refractive index of polyethylene.

This gradient of refractive index of the low density layer 302 against the infrared rays may be attained by, for example, imparting a fine roughness to the surface of polyethylene so as to change the content of polyethylene per unit volume. The refractive index increases with the content of polyethylene per unit volume. Therefore, by changing the depth of the fine concave portion continuously along the direction of depth, the content of polyethylene can be changed along the direction of depth and thereby to change the refractive index of the low density layer against the infrared rays. For example, the ultrahigh molecular, high density polyethylene has the refractive index of about 1.5 against the infrared rays within the wavelength range of about 8 to 12 $\mu$m. The difference between the refractive index against the infrared rays and that of against air brings the surface reflection loss of about 4%. The surface reflection loss of the protective film 3 can be decreased by providing the second antireflection layer having such a refractive index distribution that the refractive index increases with accessing to the protective film 3. The thickness of the low density layer is preferably 1 to 3 μm, which is the one fourth of the length of the incident light.

The low density layer 302 may be formed, for example, according to the following manner.

(Formation Method 1)

The low density layer may be formed by transferring the fine roughness pattern formed on the mold surface of the mold 6 onto the surface of the protective film 3. The mold 6 is one of the pair of molds employed in the step of the fusion bonding shown in FIG. 4 and disposed so as to contact with the protective film 3. The fine roughness pattern formed on the mold surface of the mold 6 can be formed by the surface treatment such as an etching that the mold surface is etched with the acid solution or blasting. It is to be noted that the fine roughness on the mold surface is formed so that the maximum height Ry that is stated by JIS B 0601 is less than the thickness of the low density layer. The value of the maximum height Ry is preferably less than 3 μm. A layer having the fine roughness corresponding to the fine roughness on the mold surface can be formed on the surface of the protective film by the transfer method. Accordingly, the low density layer having such a structure that the porosity and the content of the ultrahigh molecular, high density polyethylene increase with accessing to the high density layer can be obtained.

(Formation Method 2)

The polyethylene having a weight-average molecular weight of 10,000 to 500,000 is laminated on the surface of the protective film 3 by hot-pressing. The formation of the protective film and the lamination of the polyethylene having the weight-average molecular weight of 10,000 to 500,000 can be carried out in one step operation, for example, by overlaying the ultrahigh molecular weight, high density polyethylene film and the polyethylene film having the weight-average molecular weight of 10,000 to 500,000 on the protective film in this order so as to form a laminated pre-structure, and subsequently by hot-pressing laminated pre-structure. It is also possible to laminate the polyethylene film having a weight-average molecular weight of 10,000 to 500,000 on the protective film after forming the protective film. In the lamination by hot pressing, mixed phase consisting of the polyethylene film having the weight-average molecular weight of 10,000 to 500,000 and the ultrahigh molecular weight can be formed at the interface of the above two polyethylene films.

Then, the laminated polyethylene having the weight-average molecular weight of 10,000 to 500,000 is etched using the acid solution and removed. By this process, only the ultrahigh molecular weight, high density polyethylene can remain in the protective film, and the layer having the fine roughness can be formed on the surface of the protective film. The amount of the material removed by etching at the surface side is greater than that of the high density layer side. Accordingly, the low density layer, which has a structure that the porosity and the content of the ultrahigh molecular, high density polyethylene at the high density layer side are greater than those at the surface side, can be obtained.

Embodiment 4

Figure 9:
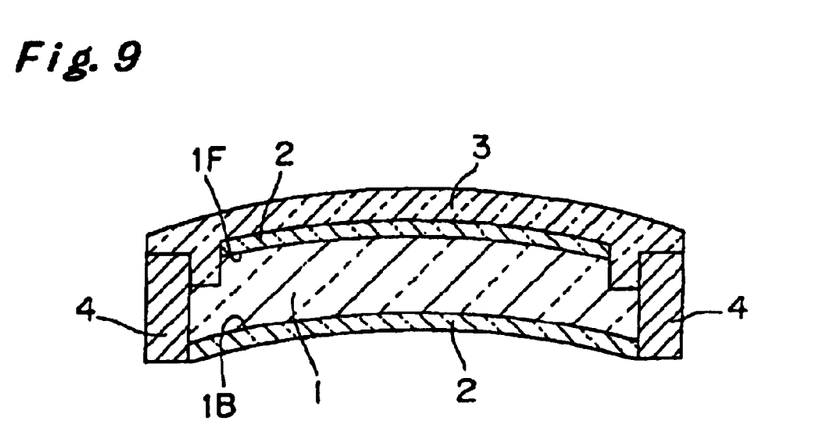
FIG. 9 is a schematic transverse cross sectional view of an optical window according to the fourth embodiment of the present invention.

FIG. 9 is a schematic cross sectional view showing the structure of the infrared transparent optical element of this embodiment. In the fourth embodiment, the optical element is similar in construction to that according to the first embodiment, except for that both major surfaces of the infrared transparent substrate 1 are convex with respect to a direction of incidence of infrared rays. By employing the infrared transparent substrate having the convex shape in place of the planar shape, the optical element can develop the lens property that reflects the light. Accordingly, it is possible to reduce the numbers of the optical lens, thereby lowering the cost of the infrared imaging camera. While the infrared transparent substrate having the convex shapes in both major surfaces, which is convex with respect to the direction of the incidence of infrared rays, is employed in this embodiment, the infrared transparent substrates having the curved shape except the above convex shape in at least one major surface have the same effect described in this embodiment.

Figure 10:
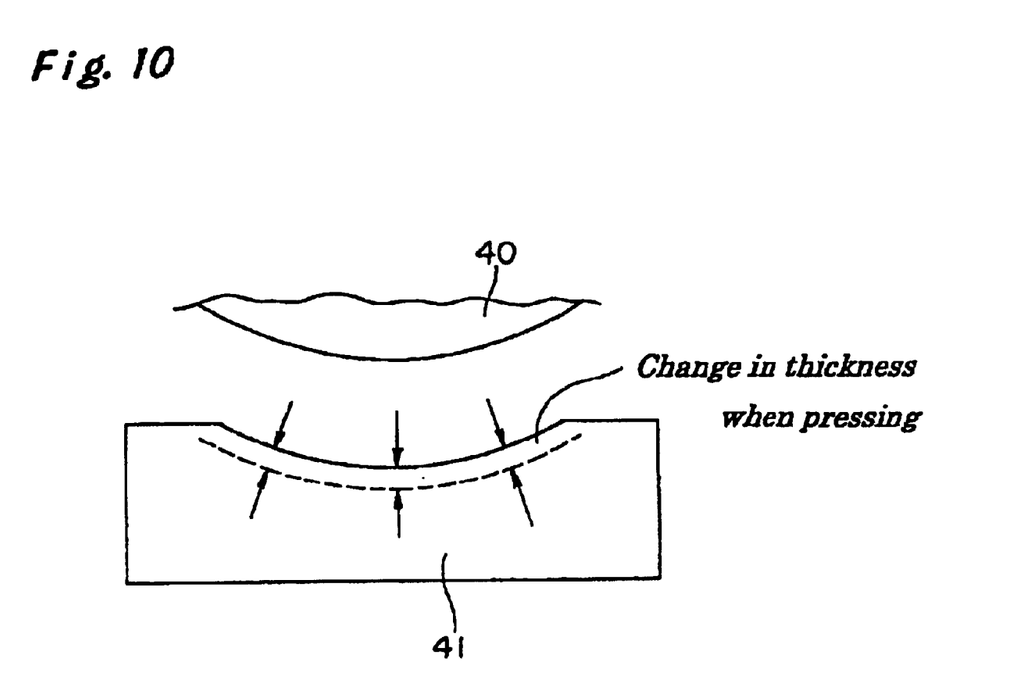
FIG. 10 is a schematic enlarged partial side cross sectional view of an optical window and an elastic member when pressing according to the fourth embodiment of the present invention.

The optical element may be formed according to the following manner by employing the infrared transparent substrates having the curved shape. In the fusion bonding step shown in FIG. 4, the ultrahigh molecular, high density polyethylene is placed on the first major surface 1F of the infrared transparent substrate 1 having the first major surface 1F and the protective film 2 formed on the second major surface 1B, thereby to complete a built-up structure for forming. Then this built-up structure is sandwiched between the pair of molds including the press 6 and the hot plate 7, inserting the elastic member 41 between the built-up structure and the press 6, and is subsequently hot pressed by the heated molds. The elastic member 41 has a surface shape corresponding to the curved shape of the first major surface 1F. As shown in FIG. 10, the ultrahigh molecular, high density polyethylene can be pressed uniformly by pressing the built-up structure through the elastic member, thereby to obtain the protective film 3 having the uniform thickness.

The surface shape of the elastic member 41 can be expressed in accordance with the following formula. That is, when the curved shape of the infrared transparent substrate is expressed in accordance with a formula by employing the three dimensional xyz-co-ordinates $$Z=f(x, y),$$

the mating surface of the elastic member capable of matching with the curved shape is expressed in accordance with a formula $$Z=f(ax, ay)/a,$$

where a is a constant in the range of $0<a\leq 1$. Accordingly, when the one major surface of the infrared transparent substrate 1 is spherical surface with a radius r, the change in thickness of the elastic member when pressing can be maintained constantly, which is about (1−a) r. If a is larger than 1, the thickness of the elastic member becomes smaller than that of the infrared transparent substrate, therefore, the stress can be applied to the directions except for z-direction.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. An infrared transparent optical element for use as an optical window for an infrared imaging camera, the infrared transparent optical element comprising:

an infrared transparent substrate having first and second major surfaces opposite to each other, wherein infrared light emanating from an object enters the infrared transparent substrate through the first major surface and emerges outwardly from the infrared transparent substrate through the second major surface;

an antireflection film on each of the first and second major surfaces of the substrate; and a protective film made of an ultrahigh molecular weight, high density polyethylene having a weight-average molecular weight not smaller than 1,600,000, the protective film being disposed on an outer surface of the antireflection film that is on the first major surface of the substrate.

2. The infrared transparent optical element according to claim 1, wherein the protective film has a thickness not greater than 0.1 mm and is fusion bonded to the antireflection film that is on the first major surface of the substrate.

3. The infrared transparent optical element according to claim 1, further comprising a metal mount enclosing the infrared transparent substrate and in contact with a peripheral side face of the infrared transparent substrate.

4. The infrared transparent optical element according to claim 3, wherein the metal mount has annular end faces opposite to each other, at least one of the annular end faces is surface roughened, and the protective film covering the first major surface of the infrared transparent substrate covers the surface roughened annular end face of the metal mount.

5. The infrared transparent optical element according to claim 3, wherein the metal mount has a coefficient of linear thermal expansion that is greater than that of the infrared transparent substrate.

6. The infrared transparent optical element according to claim 5, wherein a difference between the coefficient of linear thermal expansion of the metal mount and that of the infrared transparent substrate is at least $2 \times 10^{-6}$.

7. The infrared transparent optical element according to claim 1, wherein the infrared transparent substrate is silicon and has a thickness in a range of 1 to 3 mm.

8. The infrared transparent optical element according to claim 1, further comprising an adhesive layer made of a polymer material having a weight-average molecular weight of 10,000 to 500,000 and located between the antireflection film on the first major surface of the substrate and the protective film.

9. The infrared transparent optical element according to claim 1, wherein the infrared transparent substrate has a curved surface functioning as a lens.

10. An infrared imaging camera, comprising:

an infrared transparent optical element according to claim 1; and an optical system imaging infrared light which passes through the infrared transparent optical element.

11. The infrared transparent optical element, for use as an optical window for an infrared imaging camera, the infrared transparent optical element comprising:

an infrared transparent substrate having first and second major surfaces opposite to each other, wherein infrared light emanating from an object enters the infrared transparent substrate through the first major surface and emerges outwardly from the infrared transparent substrate through the second major surface;

an antireflection film on each of the first and second major surfaces of the substrate;

a metal mount enclosing the infrared transparent substrate and in contact with a peripheral side face of the infrared transparent substrate; and a protective film made of a polymer material and on an outer surface of the antireflection film that is on the first major surface of the substrate, wherein the protective film comprises a high density layer on the antireflection film and a low density layer on the high density layer, wherein the protective film is partly sandwiched between the peripheral side face of the infrared transparent substrate and the metal mount.

12. An infrared transparent optical element for use as an optical window for an infrared imagine camera, the infrared transparent optical element comprising:

an infrared transparent substrate having first and second major surfaces opposite to each other, wherein infrared light emanating from an object enters the infrared transparent substrate through the first major surface and emerges outwardly from the infrared transparent substrate through the second major surface;

an antireflection film on each of the first and second major surfaces of the substrate; and a protective film made of a polymer material and on an outer surface of the antireflection film that is on the first major surface of the substrate, wherein the protective film comprises a high density layer on the antireflection film and a low density layer on the high density layer.

13. The infrared transparent optical element according to claim 12, wherein the low density layer has a refractive index gradient so that reflection index at a high density layer side is greater than that at a low density layer side.

14. An infrared imaging camera, comprising:

an infrared transparent optical element according to claim 12; and an optical system imaging infrared light which passes through the infrared transparent optical element.

* * * * *